(12) United States Patent
Noguchi et al.

(10) Patent No.: US 7,083,035 B2
(45) Date of Patent: Aug. 1, 2006

(54) MOTORCYCLE CLUTCH LEVER MECHANISM

(75) Inventors: Yuji Noguchi, Saitama (JP); Yoshinobu Tateshima, Saitama (JP); Tatsunori Shimoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 91 days.

(21) Appl. No.: 10/853,162

(22) Filed: May 26, 2004

(65) Prior Publication Data
US 2005/0029073 A1 Feb. 10, 2005

(30) Foreign Application Priority Data
Jun. 6, 2003 (JP) .............................. 2003-163025

(51) Int. Cl.
*G05G 1/04* (2006.01)
*B62M 25/04* (2006.01)
*F16D 13/75* (2006.01)

(52) U.S. Cl. ................. 192/99 S; 74/502.2; 192/111 R

(58) Field of Classification Search ..................... None
See application file for complete search history.

(56) References Cited

U.S. PATENT DOCUMENTS

| 4,833,937 A | * | 5/1989 | Nagano ................. 74/501.5 R |
| 4,914,971 A | * | 4/1990 | Hinkens et al. ............ 74/502.2 |
| 5,862,711 A | * | 1/1999 | Oda .......................... 74/502.4 |
| 6,405,613 B1 | * | 6/2002 | Lim ........................... 74/502.4 |

FOREIGN PATENT DOCUMENTS

JP 2001-14047 A 1/2001

* cited by examiner

*Primary Examiner*—Rodney H. Bonck
(74) *Attorney, Agent, or Firm*—Birch, Stewart, Kolasch & Birch, LLP

(57) ABSTRACT

A concave portion and a convex portion are provided to the end face of a lever cover and a face opposite to the end face on the side of a dial member, a hexagonal head of an adjusting bolt is fitted into a hexagonal hole of the dial member, and a flange of the lever cover is covered with the dial member so that the concave portion and the convex portion are fitted and the flange of the lever cover is fitted into an annular groove. The adjustment of the quantity in which clutch wire is pulled can be easily determined and the fine adjustment of the quantity can be precisely made as desired.

20 Claims, 14 Drawing Sheets

MOTORCYCLE CLUTCH LEVER MECHANISM

CROSS-REFERENCE TO RELATED APPLICATIONS

The present application claims priority under 35 USC 119 to Japanese Patent Application No. 2003-163025 filed on Jun. 6, 2003 the entire contents thereof is hereby incorporated by reference.

BACKGROUND OF THE INVENTION

1. Field of the Invention

The present invention relates to an improvement with regard to a clutch lever mechanism of a motorcycle.

2. Description of Background Art

Heretofore, various techniques for improving a clutch lever mechanism of a motorcycle have been proposed, for example, as set forth in JP-A-2001-14047, FIG. 7.

FIG. 20 of the drawings is equivalent to FIG. 7 in JP-A-2001-14047. However, the reference numbers used in FIG. 20 are newly allocated and some of the names for the element have been changed.

A clutch lever mechanism is mainly composed of a clutch lever 113 attached to a lever bracket 111 and fitted to one end of clutch wire 121 shown by an imaginary line with an O ring 115 fitted to the lever bracket 111 and an adjusting bolt 120 screwed into the lever bracket 111. An outer cap 116 is integrated with the adjusting bolt 120. A fixing flange 127 together with a clutch wire fixing hole 129 and a clutch lever fixing bolt 131 are provided.

FIG. 21 is an exploded view showing the main parts in FIG. 20, with the lever bracket 111 being illustrated with the O ring 115 fitted thereon. The adjusting bolt 120 and the outer cap 116 are provided with the adjusting bolt 120 being inserted together with the outer cap 116.

The adjusting bolt 120 is screwed to the outer cap 116 and is axially moved by turning the outer cap 116. Thus, the quantity of pulling of the clutch wire can be adjusted.

As the outer cap 116 is fitted to the lever bracket 111 to which the O ring, 115 is fitted, the idle running of the outer cap 116 can be inhibited by frictional force between the outer cap 116 and the O ring 115.

The adjustment of the quantity of pulling of the clutch wire can be observed based on the amount of turning of the outer cap 116 to some extent.

However, as the outer cap has no scale and is continuously turned, it is difficult to observe the quantity of turning of the outer cap 116.

In addition, an abrasion and the permanent set in fatigue of the O ring 115 respectively by a secular change may be caused-between the outside periphery of the O ring 115 and the outer cap 116.

Then, the object of the invention is to provide a clutch lever mechanism in which the turned quantity of an outer cap can be easily grasped and abrasion and a permanent set in fatigue are hardly caused.

SUMMARY AND OBJECTS OF THE INVENTION

To achieve the objects of the present invention, a clutch lever mechanism for a motorcycle is provided wherein a lever bracket is attached to a handlebar with a clutch lever being attached to the lever bracket so that the clutch lever can be operated. One end of clutch wire is connected to the clutch lever so that a clutch can be operated by the clutch lever with an adjusting bolt being screwed to the lever bracket. The pulled quantity of the clutch lever can be adjusted by turning the adjusting bolt by use of a dial member made of elastic material and provided with a finger positioning part for positioning a finger on the peripheral face that is set on the adjusting bolt. The adjusting bolt can be turned via the dial member. The lever bracket is covered with a lever cover made of elastic material and arranged in series with the dial member along the clutch wire. A concave portion/a convex portion is provided adjacent to the end face of the lever cover. To the face opposite to the end face on the side of the dial member and after the dial member is turned, the convex portion provided to one of the face on the side of the dial member and the end face of the lever cover can be fitted into an arbitrary concave portion provided to the other.

The concave portion or the convex portion formed on the end face of the lever cover and the face opposite to the end face on the side of the dial member is an elastic member and the concave portion and the convex portion are fitted relative thereto.

As the convex portion provided to one of the face on the side of the dial member or the end face of the lever cover hits the concave portion provided to the other, is raised and is fitted again when the dial member is turned, a clear click can be acquired.

As a result, a rider (an operator) can easily grasp the quantity in which the dial member is turned and can easily grasp the adjustment of the pulled quantity of the clutch wire.

As the dial member is provided with the finger positioning part for positioning a finger on the peripheral face, the pulled quantity can be easily adjusted by a one touch operation.

As a result, a fine adjustment of the pulled quantity can be precisely made as it is desired.

Further, the clutch lever mechanism according to the present invention has a simple structure composed of the adjusting bolt, the dial member and the lever cover. Thus, the number of parts can be reduced and the man hours for assembly can be reduced.

The present invention provides a convex portion that has a substantially semicircular section and a concave portion that has a substantially semicircular section.

When the convex portion engages the concave portion and is raised and is fitted again because the convex portion and the concave portion have the substantially semicircular sections, the operation is made smooth and the operation of the dial member is facilitated.

The present invention provides a dial member that is coupled to the lever cover by providing a flange to one end of the lever cover and a concave portion or a convex portion to the end of the flange, by providing an annular groove corresponding to the flange to the side of the dial member and a concave portion or a convex portion to one side forming the annular groove and by fitting the flange into the annular groove.

A structure is formed wherein the flange formed at one end of the lever cover and the annular groove formed corresponding to the flange on the side of the dial member are fitted together. That is, as the flange on the side of the lever cover is fitted into the annular groove on the side of the dial member, the dial member never falls off from the lever cover.

Further, since a structure is provided wherein the flange of the lever cover and the annular groove of the dial member are fitted together, foreign matter never enters between the respective fitted concave portion and convex portion. Thus, abrasion and the permanent set in fatigue by a secular change of the concave portion and the convex portion are hardly caused.

As a result, the durability of the clutch lever mechanism can be enhanced.

In the present invention an adjusting bolt is provided with a hexagonal head having a hexagonal section, a hexagonal hole corresponding to the hexagonal head is provided to the dial member and protrusions for pressing the hexagonal head are provided to the hexagonal hole.

As the protrusions that are provided on the hexagonal hole on the side of the dial member and the hexagonal head of the adjusting bolt is pressed by the protrusions, play in the fitted part can be eliminated.

As a result, the adjusting bolt can be more integrated with the dial member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the attached drawings, an embodiment of the present invention will be described below. The drawings shall be viewed in the direction of the reference numbers.

Figure 1:
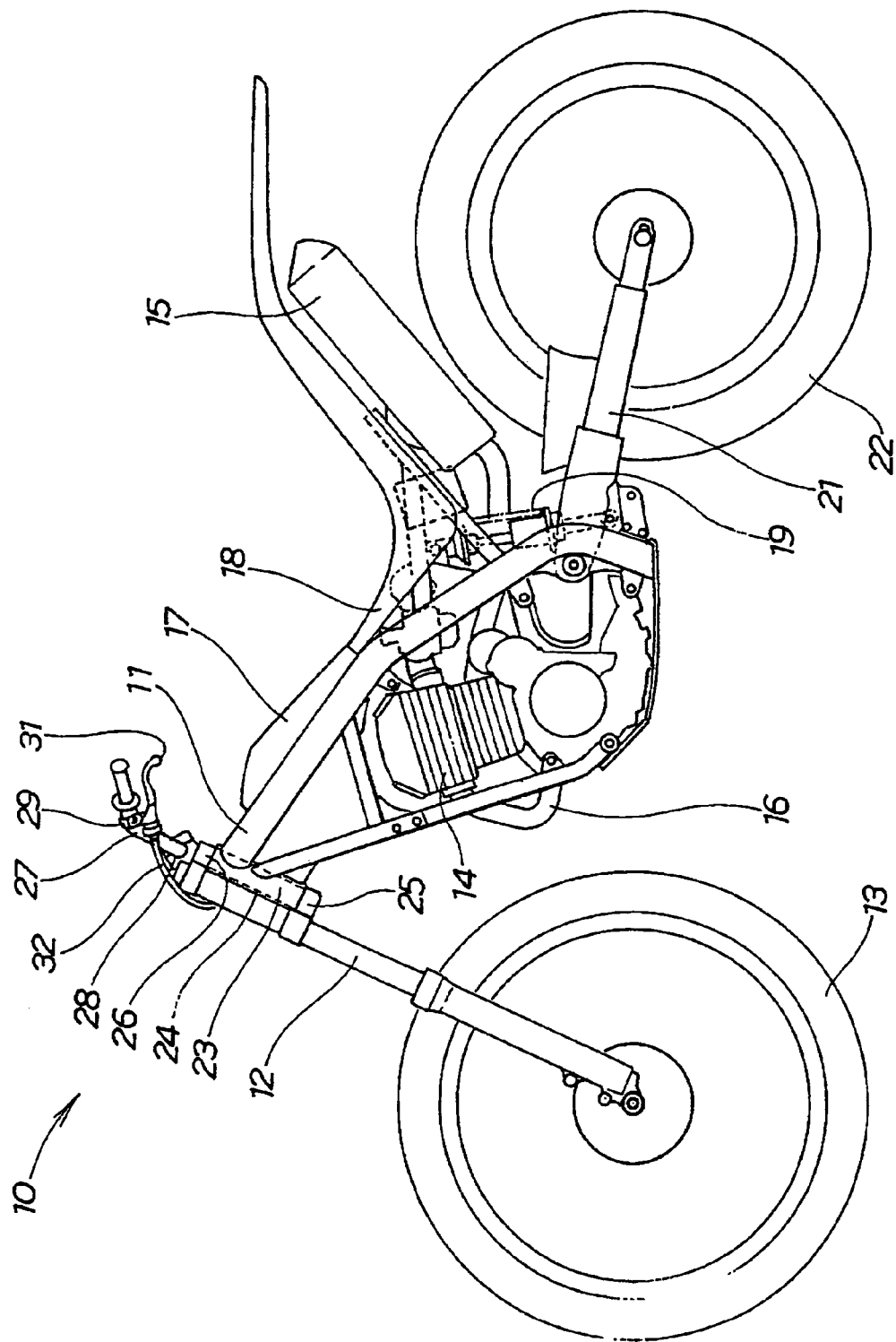
FIG. 1 is a side view showing a motorcycle according to the invention.

FIG. 1 is a side view showing a motorcycle according to the present invention. A motorcycle 10 is provided with a main frame 11, a front fork 12 is attached to the front of the main frame 11 so that the front fork can be steered. A front wheel 13 is attached to a lower part of the front fork 12. An engine 14 is suspended from the main frame 11 with an exhaust pipe 16 that conducts exhaust gas exhausted from the engine 14 into a muffler 15. A fuel tank 17 and a rider's seat 18 are arranged in a longitudinal direction of the main frame 11 with a swing arm 21 attached to the rear of the main frame 11 via a rear cushion 19 so that the swing arm can be vertically rocked. A rear wheel 22 is attached to the rear of the swing arm 21.

The front of the main frame 11 is mainly composed of a head pipe 23 fixed to the front of the main frame 11 with a stem 24 passing the head pipe 23 and functioning as a stem of the head pipe 23. A triangular bearing surface is provided with stem member 25 forming a part of the stem 24 vertically rising therefrom. The right and left front forks 12 are attached to the right and the left of the stem member 25 so that the front forks can be steered. A triangular bridge member 26 is provided for fastening the upper end of the front fork 12 and the upper end of the stem 24. Right and left holders 28 are provided on the bridge member 26 with a handlebar 27 fixed to the right and left holders 28 by bolts. A lever bracket 29 is provided to the left side of the handlebar 27 and a clutch lever 31 is attached to the lever bracket 29 so that the clutch lever can be pivoted. A clutch wire 32 is attached to the clutch lever.

Figure 2:
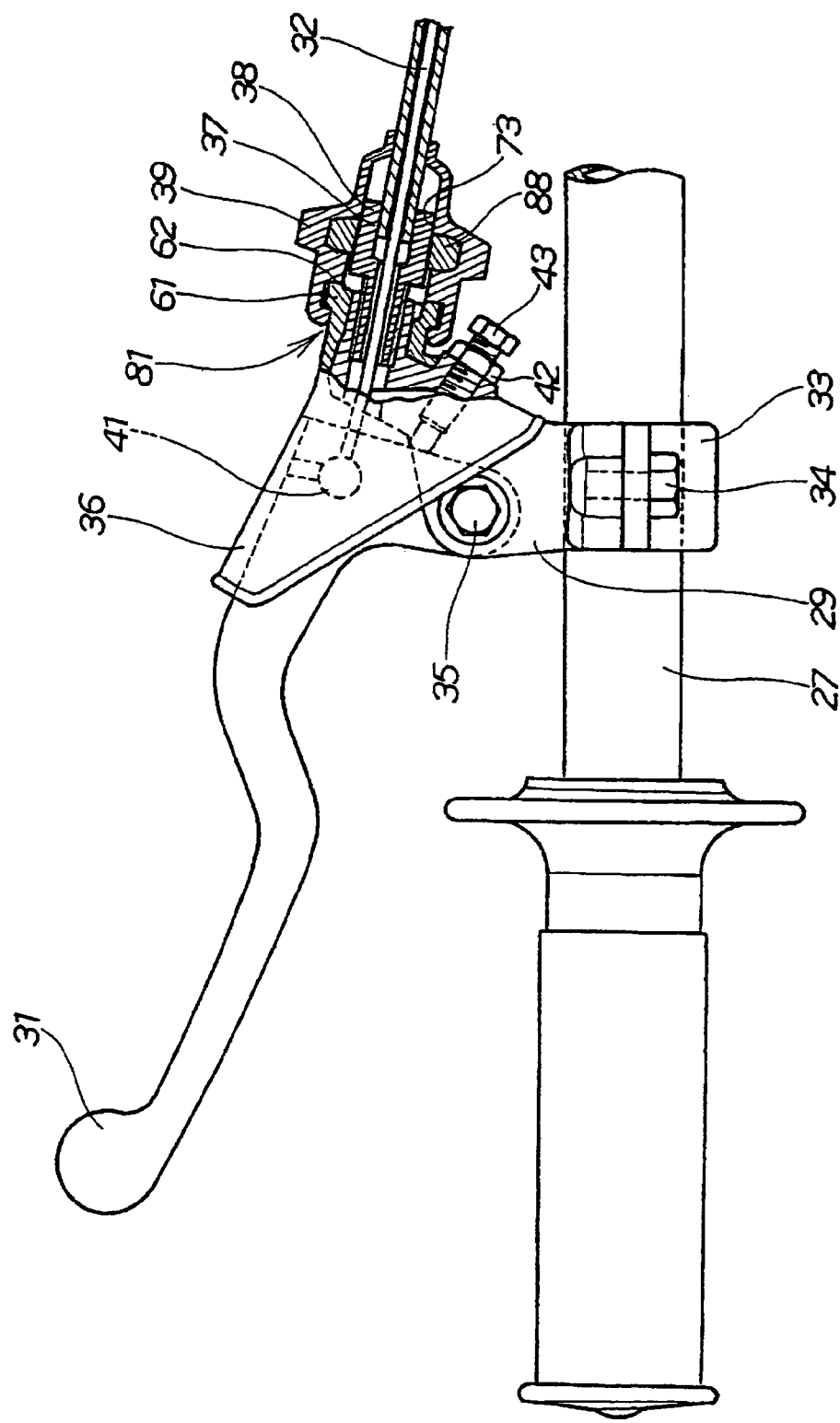
FIG. 2 is an explanatory drawing for explaining a state in which a clutch lever mechanism according to the present invention is attached.

FIG. 2 is an explanatory drawing for explaining a state in which a clutch lever mechanism according to the present invention is attached. The clutch lever mechanism is composed of the lever bracket 29 fixed to the handlebar 27 using a sub-bracket 33 and a bolt 34. The clutch lever 31 is attached to the lever bracket 29 via a lever bolt 35 so that the clutch lever can be pivoted. A lever cover 36 is provided for covering the lever bracket 29. An adjusting bolt 37 is screwed to the lever bracket 29 with a dial member 39 fitted to a hexagonal head 38 of the adjusting bolt 37 and the clutch wire 32 piercing the lever bracket 29, the lever cover 36, each center of the adjusting bolt 37 and the dial member 39 and fixed to the clutch lever 31 via a stop member 41. A detent bolt 42 is provided together with a lever adjusting bolt 43.

Figure 3:
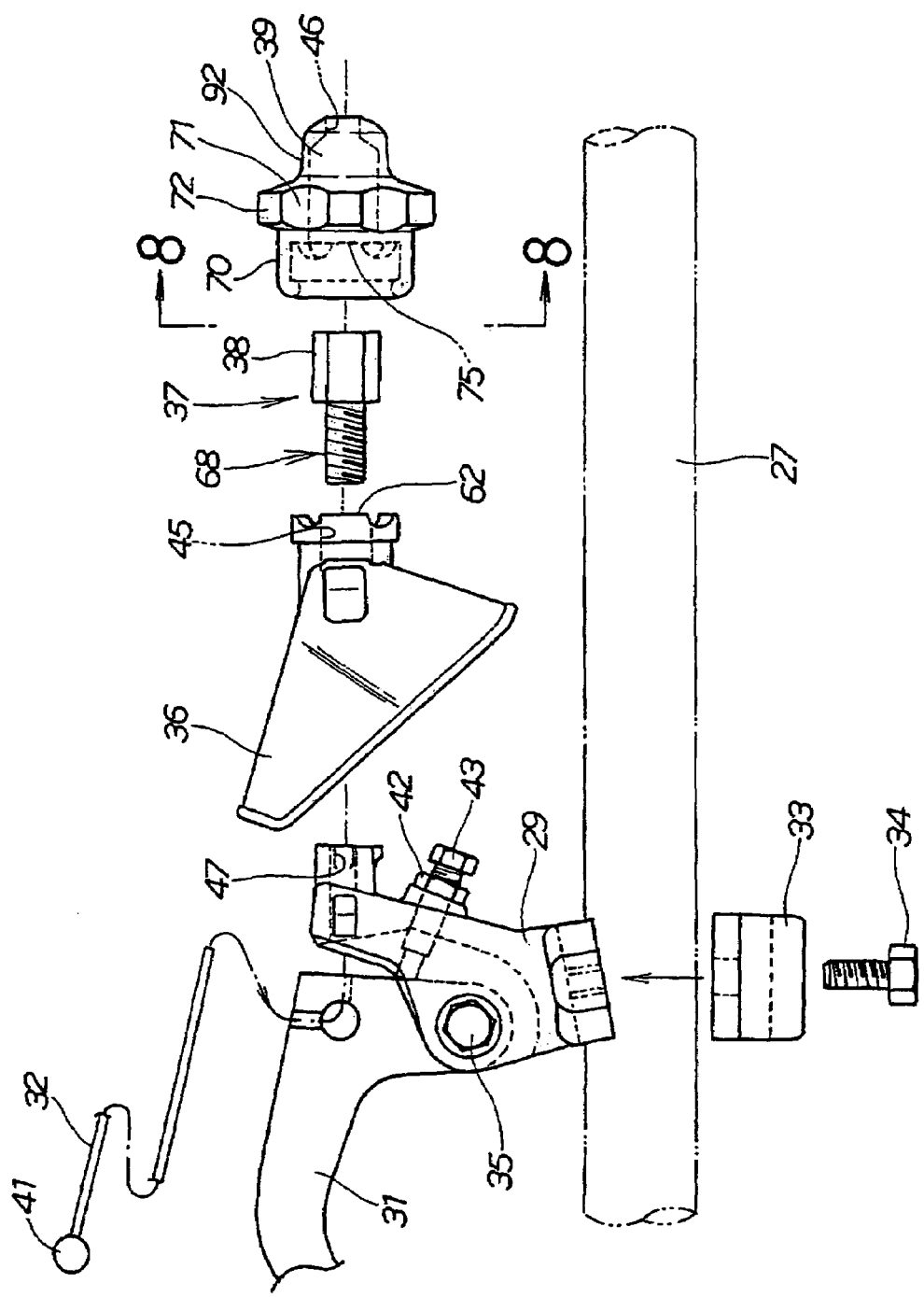
FIG. 3 is an exploded side view showing the clutch lever mechanism according to the present invention.

FIG. 3 is an exploded side view showing the clutch lever mechanism according to the present invention. The lever bracket 29 is fixed to the handlebar 27, with the clutch lever 31 attached to the lever bracket 29. The clutch wire 32 passes a bracket head fitting hole 45 of the lever cover 36 through a hole for wire 46 of the dial member 39. The clutch wire 32 is fixed to the clutch lever 31 with the lever bracket 29 being covered with the lever cover 36. The adjusting bolt 37 is screwed into an adjusting bolt fixing hole 47 of the lever bracket 29 and the adjusting bolt 37 is covered with the dial member 39 so that the dial member is fitted to the hexagonal head 38 of the adjusting bolt.

Figure 4:
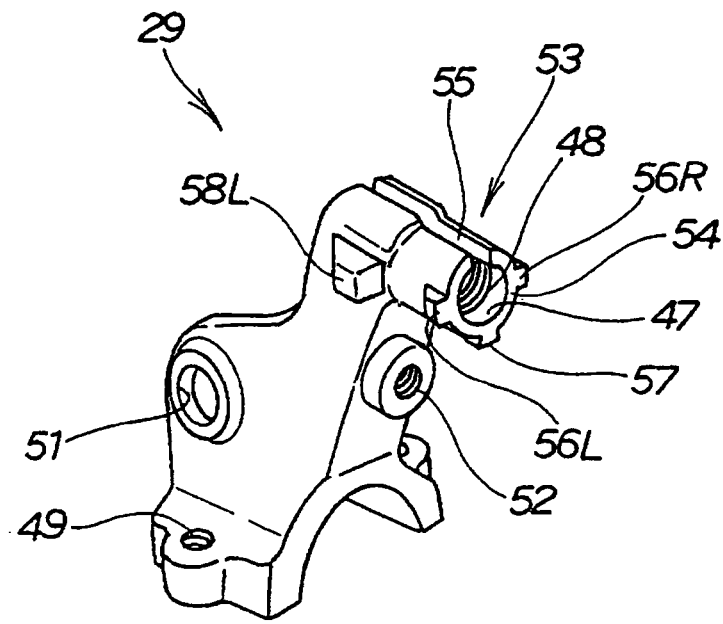
FIG. 4 is a perspective view showing a lever bracket according to the present invention.

FIG. 4 is a perspective view showing the lever bracket according to the present invention. The lever bracket 29 is a member provided with a bracket fixing hole 49 provided in two locations in a lower part. A lever bolt hole 51 is provided for fixing the clutch lever above the bracket fixing hole 49. A lever adjusting bolt hole 52 is provided for adjusting the position of the clutch lever. A bracket head 53 is arranged above the lever adjusting bolt hole 52 with a lever bracket end face 54 provided to the bracket head 53. The adjusting bolt fixing hole 47 is made on the end face 54. A female screw 48 is provided for the adjusting bolt formed in the adjusting bolt fixing hole 47. A lever bracket slit 55 is formed on the upside of the periphery of the adjusting bolt fixing hole 47 with a left protrusion 56L and a right protrusion 56R respectively formed on the left and the right of the periphery of the fixing hole 47, a lower protrusion 57 formed on the downside of the periphery of the fixing hole 47 and side protrusions 58L, 58R (not shown) provided to each rear of the left and the right of the bracket head 53.

Figure 5:
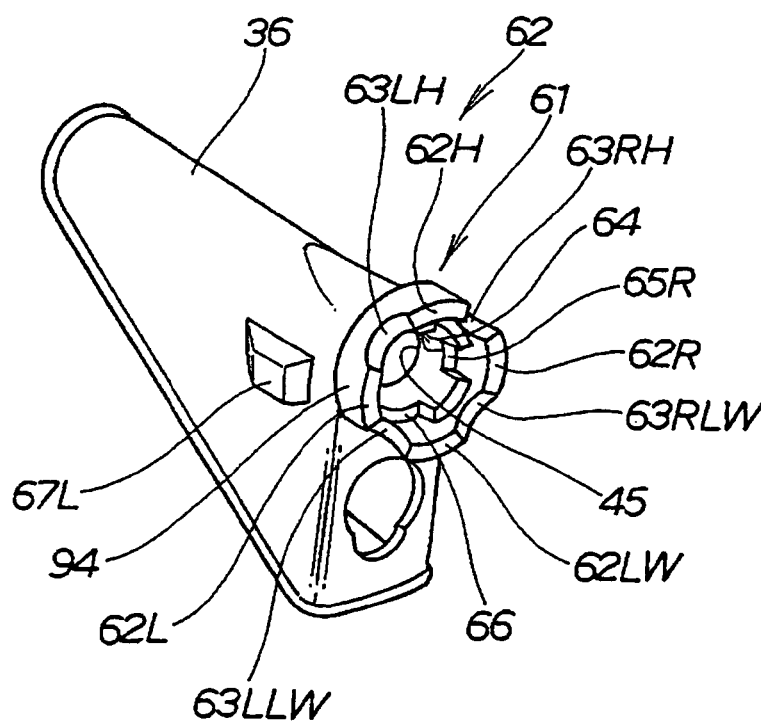
FIG. 5 is a perspective view showing a lever cover according to the present invention.

FIG. 5 is a perspective view showing the lever cover according to the present invention. The lever cover 36 is a member provided with a flange 61 provided to one end with the bracket head fitting hole 45 made on the end face 62 of the flange 61. The end face 62 is provided to the periphery of the bracket head fitting hole 45, upper, lower, left and right end faces 62H, 62LW, 62L, 62R, respectively, forming the end face with a left upper concave portion 63LH, a left lower concave portion 63LLW, a right upper concave portion 63RH and a right lower concave portion 63RLW respectively having a substantially semicircular section and respectively being formed between two of these upper, lower, left and right end faces 62H, 62LW, 62L, 62R. A convex slit fitted portion 64 is provided to the upside of the periphery of the bracket head fitting hole 45 and is fitted to the lever bracket slit of the lever bracket not shown. Left and right concave protrusions are fitted portions 65L (not shown), 65R provided to the left and the right of the periphery of the bracket head fitting hole 45 and fitted to the left and right protrusions of the lever bracket not shown. A concave lower protrusion fitted portion 66 is provided to the downside of the periphery of the bracket head fitting hole 45 and is fitted to the lower protrusion of the lever bracket not shown with left and right side protrusion fitted portions 67L, 67R (not shown) provided at the back of the flange 61 and fitted to left and right side protrusions provided on the left and right sides in the rear of the bracket head of the lever bracket not shown.

Figure 6:
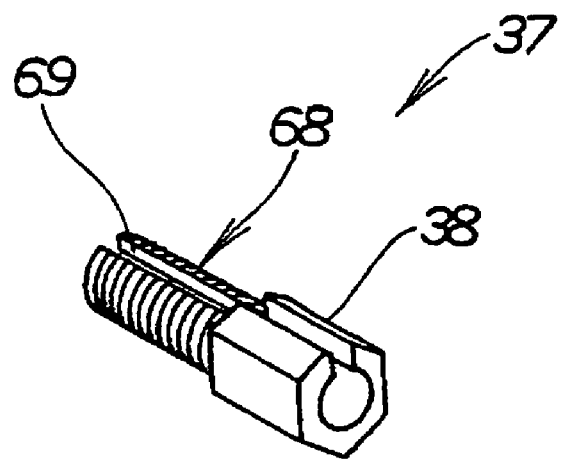
FIG. 6 is a perspective view showing an adjusting bolt according to the present invention.

FIG. 6 is a perspective view showing the adjusting bolt according to the present invention. The adjusting bolt 37 is composed of the hexagonal head 38, a male screw 68 and a bolt slit 69 provided to enable the attachment/detachment of the clutch wire not shown axially.

Figure 7:
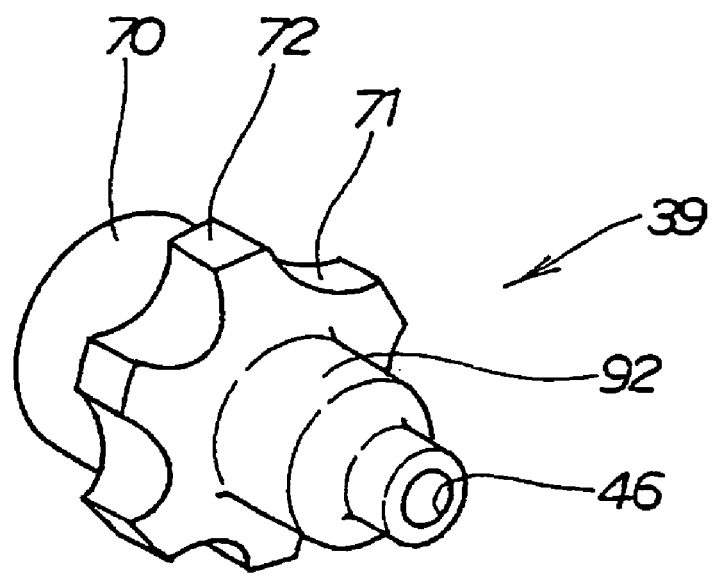
FIG. 7 is a perspective view showing a cable adjusting dial according to the present invention.

FIG. 7 is a perspective view showing the dial member according to the present invention. The dial member 39 is provided with a hole for the clutch wire 46, a part 71 for positioning a finger for operation, a peripheral face 72 and a drum 70.

Figure 8:
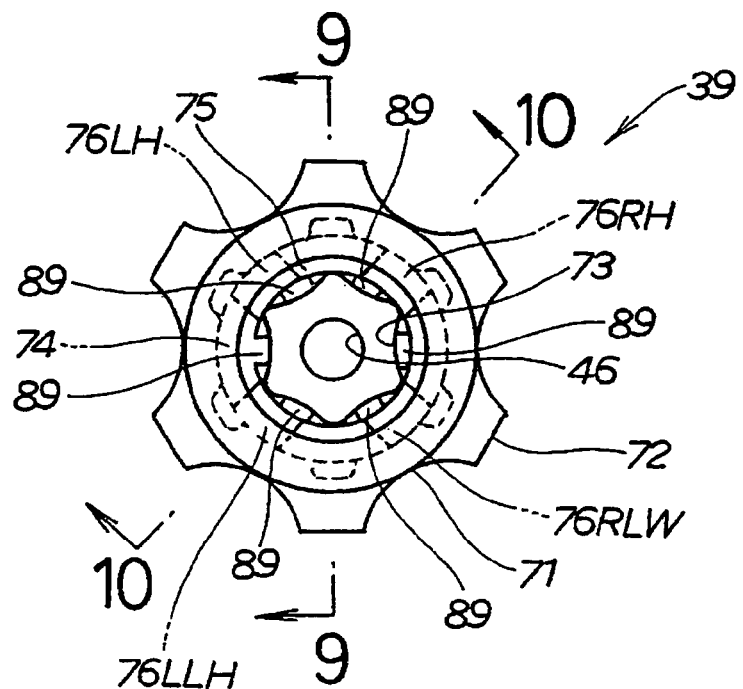
FIG. 8 is a view viewed along a line 8—8 shown in FIG. 3.

FIG. 8 is a view along a line 8—8 shown in FIG. 3. The dial member 39 is provided with a hexagonal hole 73 fitted to the adjusting bolt with the hole for the clutch wire 46 provided coaxially with the hexagonal hole 73. The part 71 for positioning a finger for operation is provided adjacent to the peripheral face 72 with a molding 74 for preventing the flange of the lever cover not shown from falling off. A left upper convex portion 76LH is formed on a face 75 on the side of the dial member with a right lower convex portion 76RLW opposite to the left upper convex portion, a right upper convex portion 76RH arranged next to the left upper convex portion 76LH and a left lower convex portion 76LLW opposite to the right upper convex portion.

Figure 9:
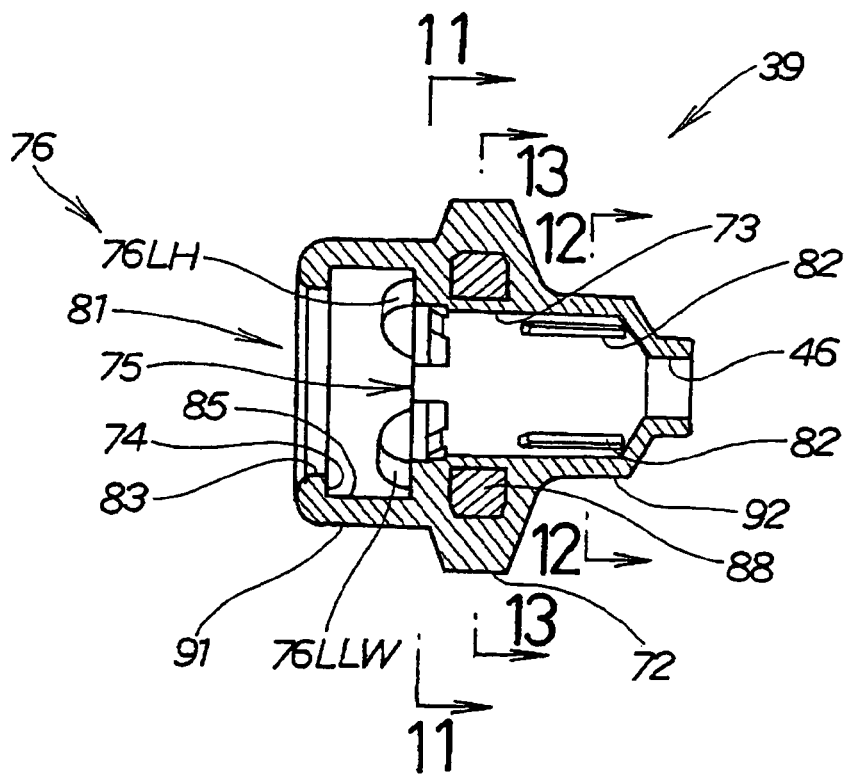
FIG. 9 is a sectional view viewed along a line 9—9 shown in FIG. 8.

FIG. 9 is a sectional view long a line 9—9 shown in FIG. 8. The dial member 39 is provided with an annular groove 81 with the hexagonal hole 73 axially provided next to the annular groove 81 and a small protrusion 82 in a part of the inner wall of the hexagonal hole 73.

The annular groove 81 is composed of an entrance face 83 arranged in parallel with the axis with the molding 74 formed at a right angle with the axis inside the entrance face 83. An inner face 85 is formed next to the molding 74 in parallel with the axis and a face 75 on the side of the dial member is arranged next to the inner face 85 in parallel with the molding 74. As shown in FIG. 9, the dial member 39 is provided with four convex portions 76 having a substantially semicircular section on the face 75 on the side of the dial member. As set forth in the drawings, the left upper convex portion 76LH and the left lower convex portion 76LLW are shown.

Figure 10:
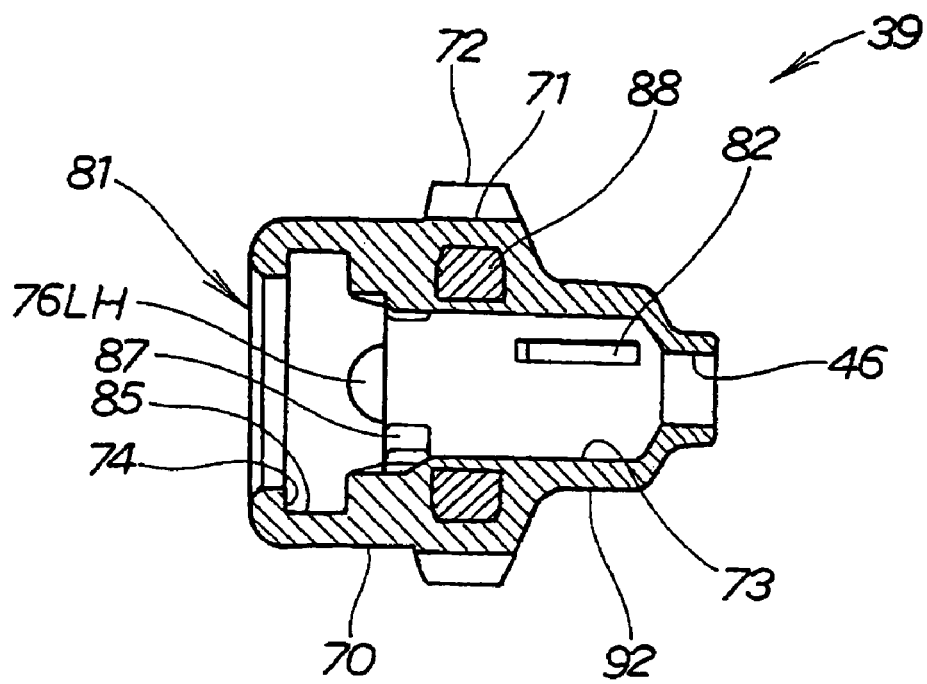
FIG. 10 is a sectional view viewed along a line 10—10 shown in FIG. 8.

FIG. 10 is a sectional view along a line 10—10 shown in FIG. 8. The dial member 39 is provided with the annular groove 81 and the hexagonal hole 73 axially connected to the annular groove 81. In the hexagonal hole 73, a plurality of front small protrusions 87 and a plurality of small protrusions 82 are provided on a part of the inner wall of the hexagonal hole 73 to eliminate the play of a part to which the adjusting bolt not shown and the dial member 39 are fitted. A core member 88 is provided in the dial member 39.

Figure 11:
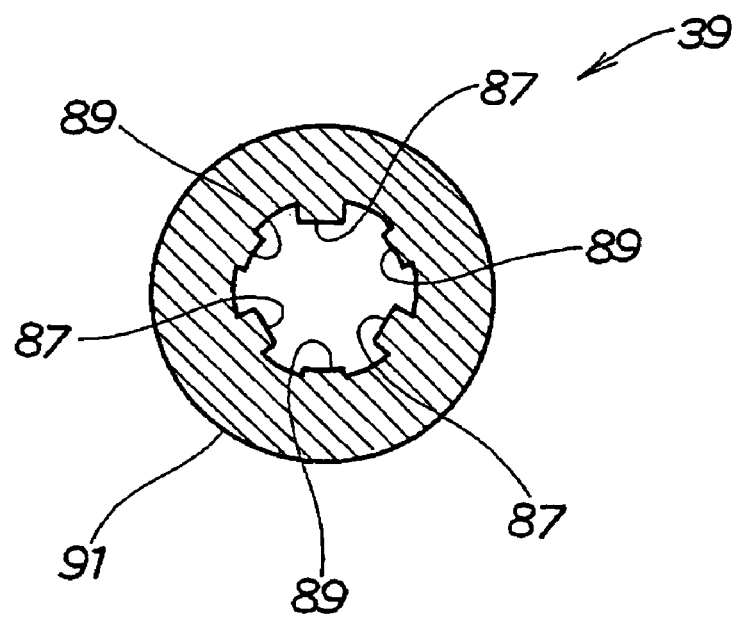
FIG. 11 is a sectional view viewed along a line 11—11 shown in FIG. 9.

FIG. 11 is a sectional view along a line 11—11 shown in FIG. 9 wherein the dial member 39 is provided with a part 89 for preventing the core member 88 (see FIG. 10) from barely coming out of the entrance of the hexagonal hole.

Therefore, the core member 88 can be prevented from being peeled or falling off from the hexagonal hole. A drum 91 is provided around the core member 88.

Figure 12:
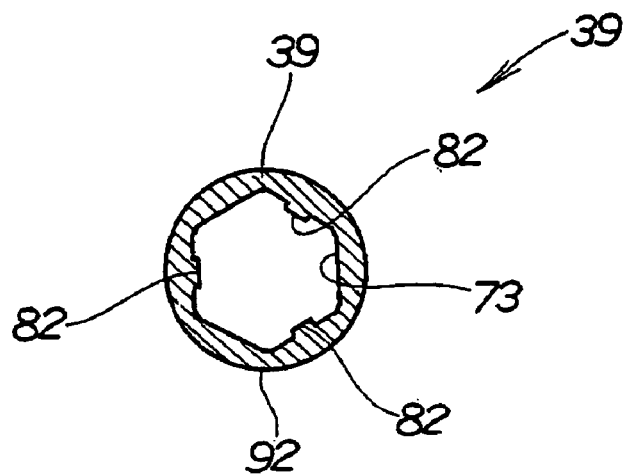
FIG. 12 is a sectional view viewed along a line 12—12 shown in FIG. 9.

FIG. 12 is a sectional view viewed along a line 12—12 shown in FIG. 9 wherein the dial member 39 is provided with the plurality of small protrusions 82 to a part of the inner wall of the hexagonal hole 73 to eliminate the play of the part on which the adjusting bolt not shown and the dial member 39 are fitted. An upside outside periphery 92 is provided around the dial member 39.

Figure 13:
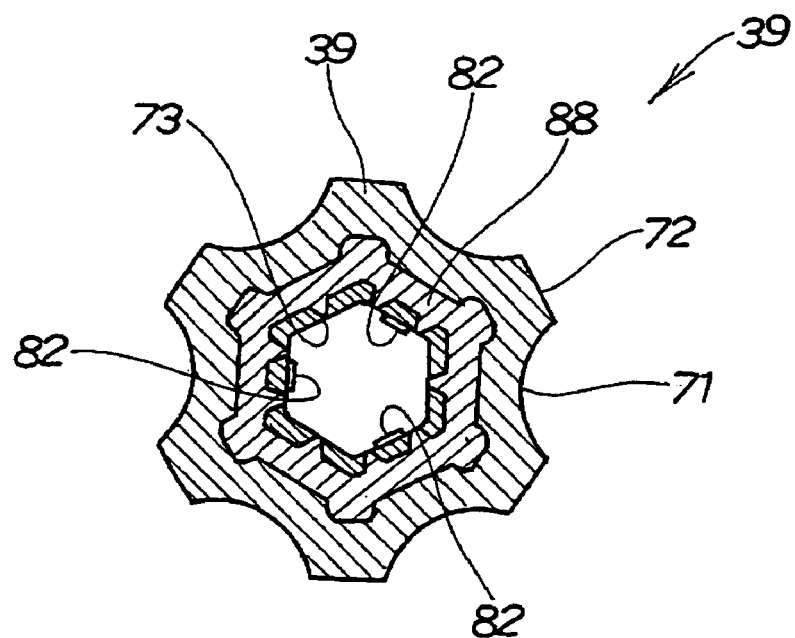
FIG. 13 is a sectional view viewed along a line 13—13 shown in FIG. 9.

FIG. 13 is a sectional view along a line 13—13 shown in FIG. 9 wherein the dial member 39 includes the core member 88 in the hexagonal hole 73.

As shown in FIG. 8, as the part 89 for preventing the core member 88 (see FIG. 10) from barely coming out is provided to the entrance of the hexagonal hole 73, the core member 88 can be prevented from being peeled from the hexagonal hole 73.

Figure 14:
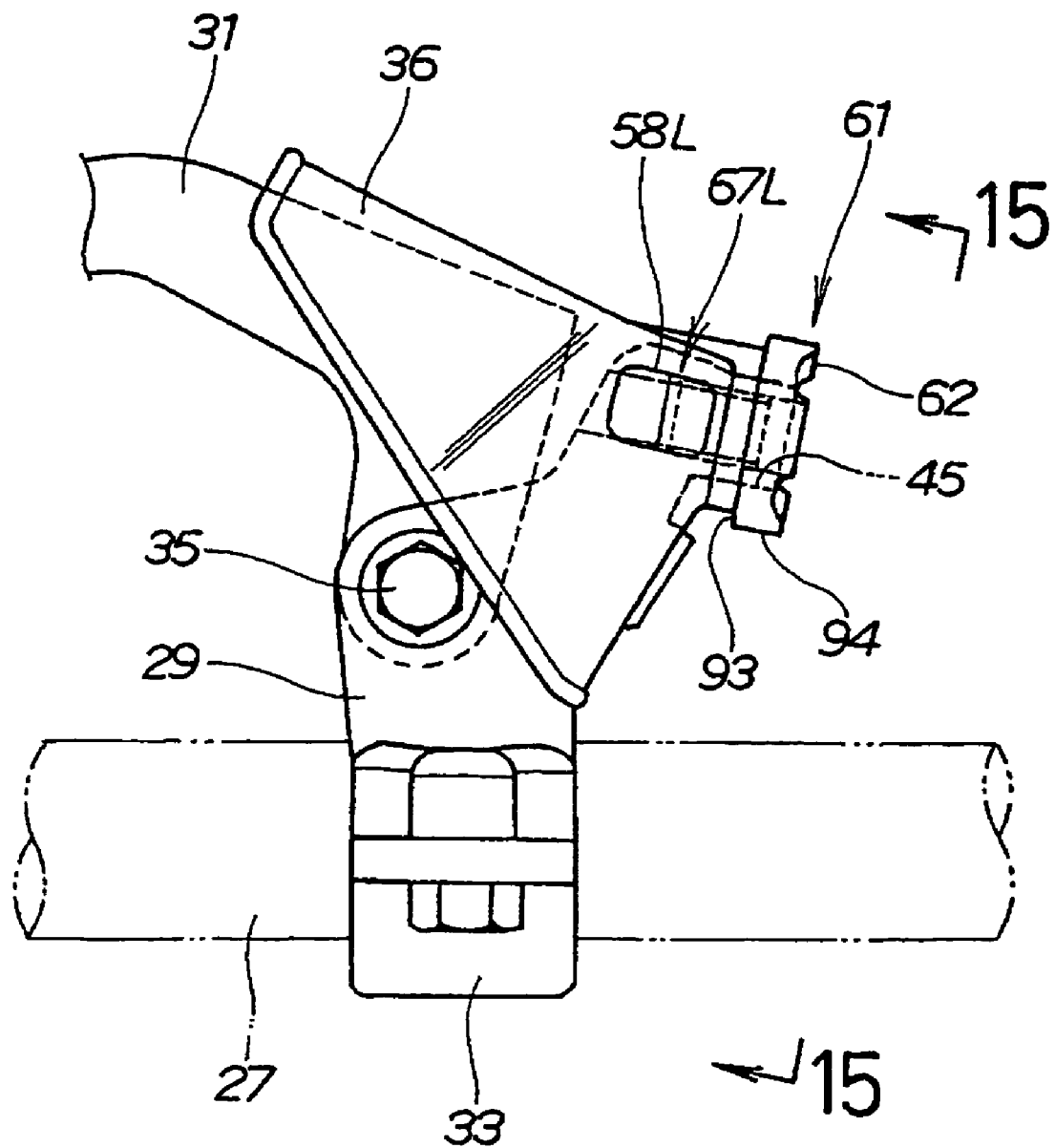
FIG. 14 shows a state in which the lever cover is attached.

FIG. 14 shows a state in which the lever cover is attached and shows that the left and right side protrusions 58L, 58R (not shown) formed on the lever bracket head are covered with the left and right side protrusion fitted parts 67L, 67R (not shown) of each lever cover 36. A back portion 93 of the flange 61 faces towards the lever bracket head.

Figure 15:
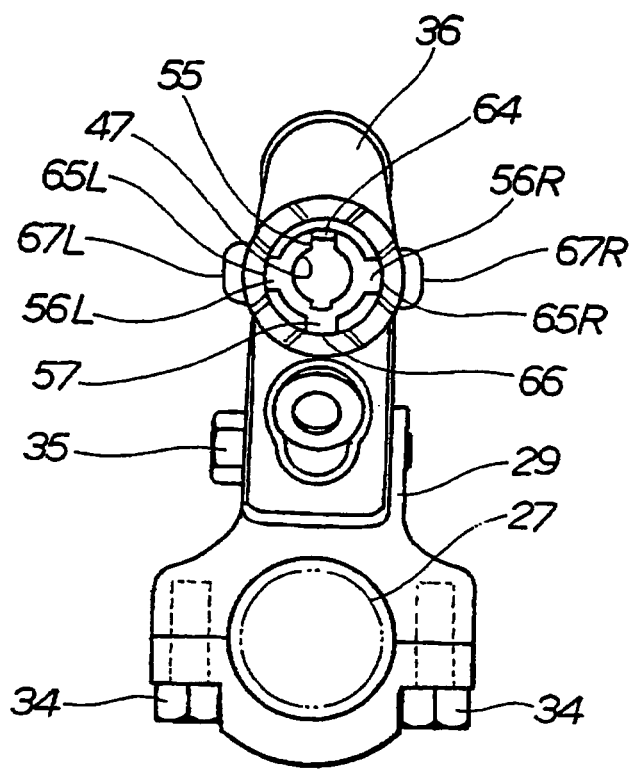
FIG. 15 is a view viewed along a line 15—15 shown in FIG. 14.

FIG. 15 is a view along a line 15—15 shown in FIG. 14 wherein the slit fitted portion 64, the left and right protrusion fitted portions 65L, 65R and the lower protrusion fitted portion 66, respectively, of the flange of each lever cover 36 are fitted to the lever bracket slit 55, the left and right protrusions 56L, 56R and the lower protrusion 57, respectively, formed on the lever bracket head.

As a result, the lever cover 36 which is an elastic member can be firmly fastened to the lever bracket 29.

Figure 16:
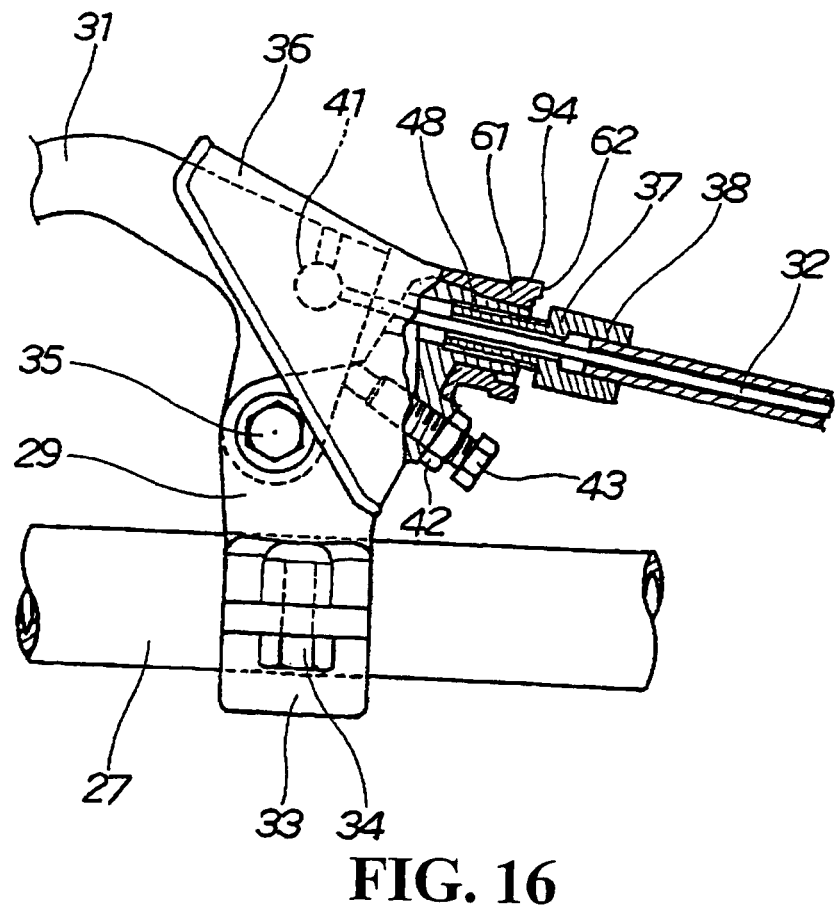
FIG. 16 shows a state in which the adjusting bolt is attached.

FIG. 16 shows a state in which the adjusting bolt is attached, and shows that the clutch wire 32 is passed through the lever bracket head fitted hole 45 (see FIG. 5) of the lever cover 36 and the hole for the clutch wire 46 (see FIG. 9) of the dial member 39 beforehand, the clutch wire 32 is fixed to the clutch lever 31, the lever bracket 29 is covered with the lever cover 36, the clutch wire 32 is inserted into the bolt slit 69 (see FIG. 6) of the adjusting bolt 37. In this state, the adjusting bolt 37 is screwed to the female screw 48 for the adjusting bolt of the lever bracket 29.

As shown in FIG. 2, the assembly is finished by covering the flange 61 of the lever cover 36 with the dial member 39 so that the hexagonal head 38 of the adjusting bolt 37 is fitted into the hexagonal hole 73 of the dial member 39 and the flange 61 of the lever cover 36 is fitted into the annular groove 81 of the dial member 39.

As the inner member 88 of the dial member 39 is buried in a part in which the head of the adjusting bolt 37 is fitted, a structure wherein the rotational play of the dial member 39 is basically prevented is acquired and the run idle can be prevented.

In addition, as the plurality of small protrusions 82 (see FIG. 9) are provided on the part in which the hexagonal head 38 of the adjusting bolt 37 and the dial member 39 are fitted with the plurality of small protrusions protruding from the dial member 39, the play of the part in which the adjusting bolt 37 and the dial member 39 are fitted can be prevented without interfering with the rotational operability of the adjusting bolt 37 and thus facilitating the axial movement in the dial member 39.

As a result, the adjusting bolt can be more integrated with the dial member and the occurrence of abrasion which may be produced in the part in which the dial member 39 and the adjusting bolt 37 are fitted can be prevented.

Figure 17A:
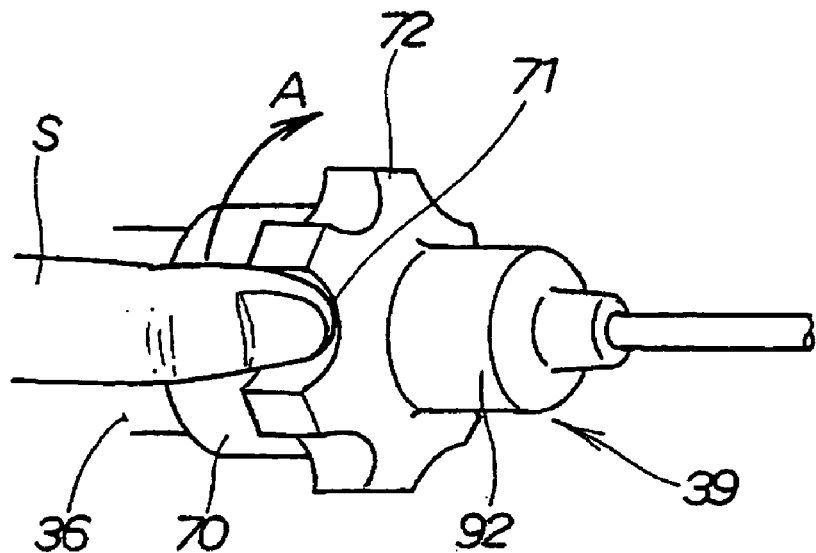
FIGS. 17(a) and 17(b) are explanatory drawings for explaining the action of a state in which a concave portion and a convex portion are fitted before the dial member is turned.
Figure 17B:
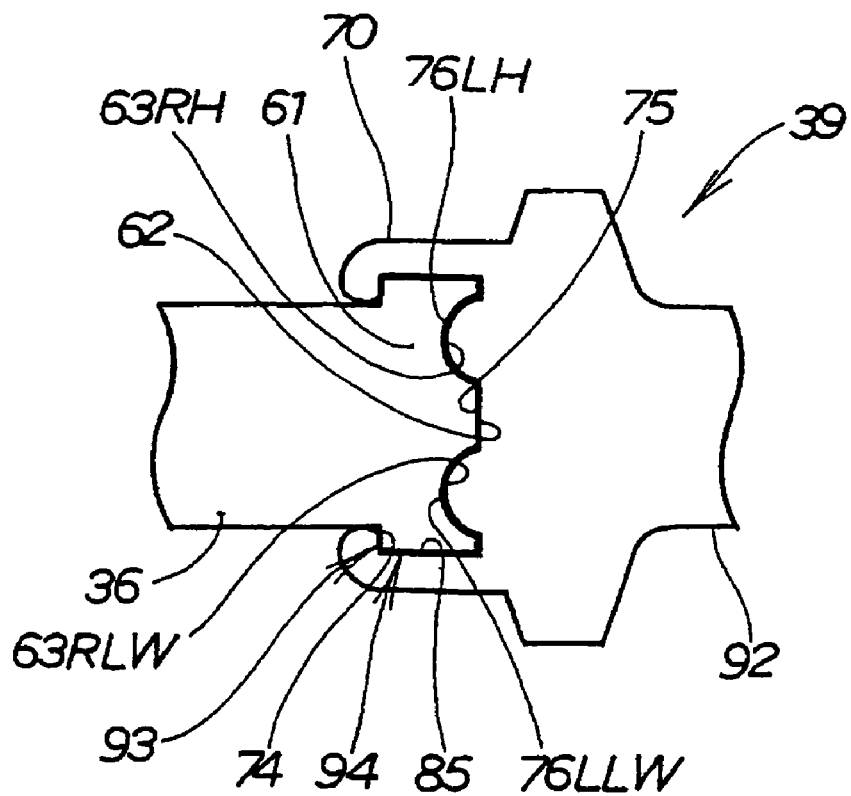

Referring to FIGS. 17(*a*) to 19(*b*), the action of the clutch lever mechanism will be described below. FIGS. 17(*a*), 18(*a*) and 19(*a*) explain the operation of the clutch lever. FIGS. 17(*b*), 18(*b*) and 19(*b*) explain the movement of the inside of the annular groove of the dial member 39 at the time wherein a state in which the concave portion formed on the end face of the flange 61 of the lever cover 36 and the convex portion formed on the face 75 on the side of the dial member are fitted.

FIGS. 17(*a*) and 17(*b*) are explanatory drawings for explaining the action of the state in which the concave portion and the convex portion are fitted before the dial member is turned and as shown in FIG. 17(*a*). A finger S is put on the finger positioning part 71 of the dial member 39 to turn the adjusting bolt not shown and adjust the pulled quantity of the clutch wire.

FIG. 17(*b*) shows that the concave portions 63RH, 63RLW having a substantially semicircular section formed on the end face 62 of the flange 61 of the lever cover 36 fitted with the convex portions 76LH, 76LLW having the substantially semicircular section formed on the face 75 of the dial member 39.

Figure 18A:
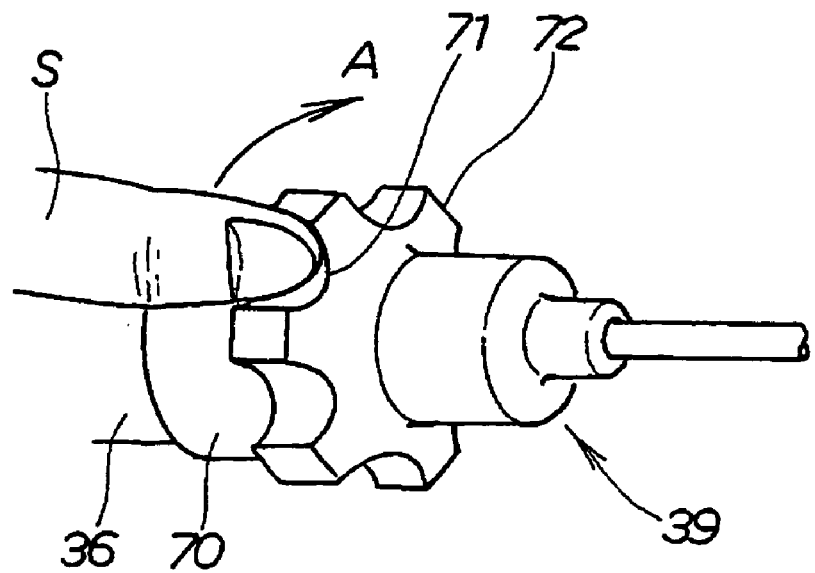
FIGS. 18(a) and 18(b) are explanatory drawings for explaining the action of a state in which the concave portion and the convex portion are fitted while the dial member is turned.
Figure 18B:
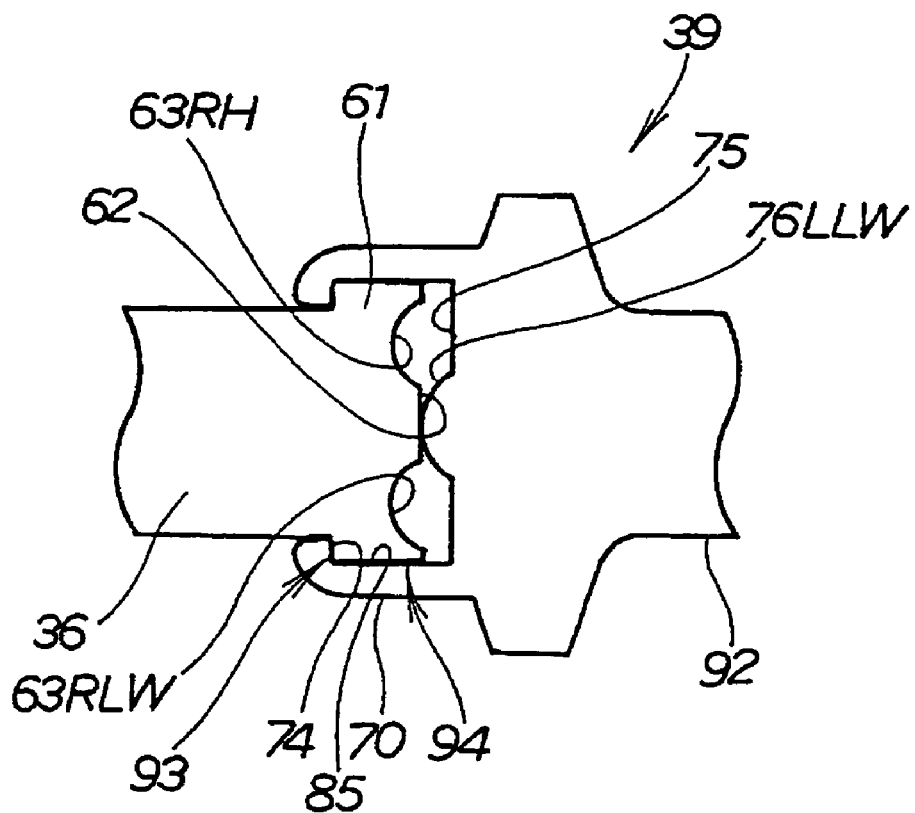

FIGS. 18(*a*) and 18(*b*) are explanatory drawings for explaining the action of the state in which the concave portion and the convex portion are fitted while the dial member is turned. As shown in FIG. 18(*a*), force is applied to the finger S put on the finger positioning part 71 and the dial member 39 is turned in a direction shown by an arrow A.

FIG. 18(*b*) shows that fitting between the concave portions 63RH, 63RLW formed on the end face 62 of the flange 61 of the lever cover 36 and the convex portions 76LH (see FIGS. 17(*a*) and 17(*b*)) with element 76LLW formed on the face 75 of the dial member 39 being released and the convex portion 76LLW formed on the left downside of the dial member 39 hitting the end face 62 of the flange 61 of the lever cover 36.

As the concave portion of the lever cover 36 and the convex portion of the dial member 39 are formed by each elastic member, an operational feeling of the dial member 39 can be arbitrarily set by changing the specification such as a characteristic of the elastic members, the contour and the dimension of the concave portion and the convex portion.

As a result, it is possible to have a smooth and secure operation of the pulled quantity of the clutch wire.

In addition, the flange 61 is provided to one end of the lever cover 36, the annular groove corresponding to the flange 61 is provided to the side of the dial member 39, the convex portion is provided to one side forming the annular groove, and the dial member 39 is coupled to the lever over 36 so that the flange 61 is fitted into the annular groove.

However, when a state in which the concave portion and the convex portion are fitted is temporarily released by turning the dial member 39, a force that tries to make the dial member 39 axially deviate from the lever cover 36 is generated and the dial member 39 may be detached from the lever cover 36.

Then, to prevent circumferential displacement, the side 94 of the flange 61 is fitted to the inner face 85 of the dial member 39 and to prevent axial deviation, the molding 74 of the dial member 39 is fitted to the back 92 of the flange 61.

Therefore, as viewed in an axial direction, a state is achieved wherein the molding 74 of the dial member 39 is fitted to the back 93 of the flange 61 when the fitted state is temporarily released by turning the dial member and the dial member 39 tries to axially deviate from the lever cover 36. Thus, the dial member 39 can be securely prevented from being detached from the lever cover 36.

In addition, a secure click and a suitably soft turn can be acquired by arbitrarily adjusting the rigidity of the flange 61 formed on the lever cover 36.

Further, as a structure wherein the flange 61 is fitted into the annular groove is acquired, no foreign matter enters between the respective fitted concave portion and convex portion, abrasion and a permanent set in fatigue, respectively, by a secular change are basically prevented and the durability of the clutch lever mechanism can be enhanced.

Figure 19A:
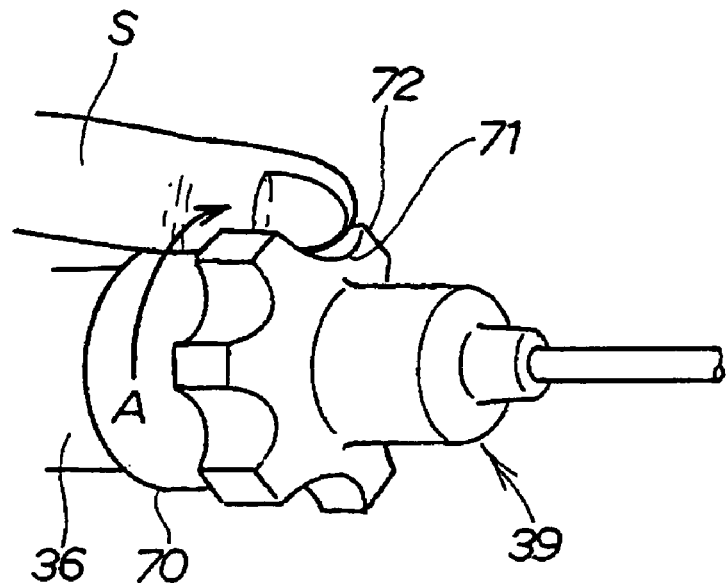
FIGS. 19(a) and 19(b) are explanatory drawings for explaining the action of a state in which the concave portion and the convex portion are fitted after the dial member is turned.
Figure 19B:
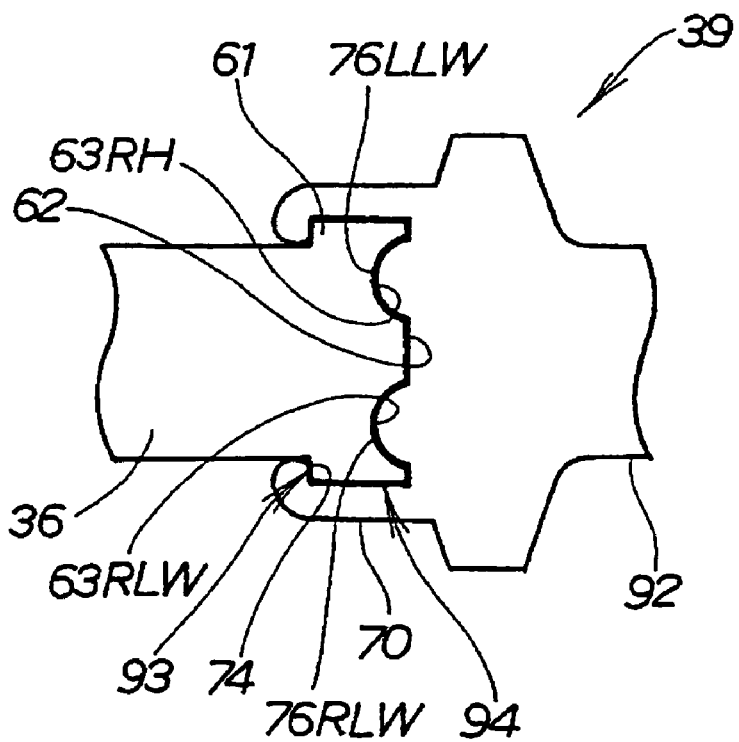
Figure 20:
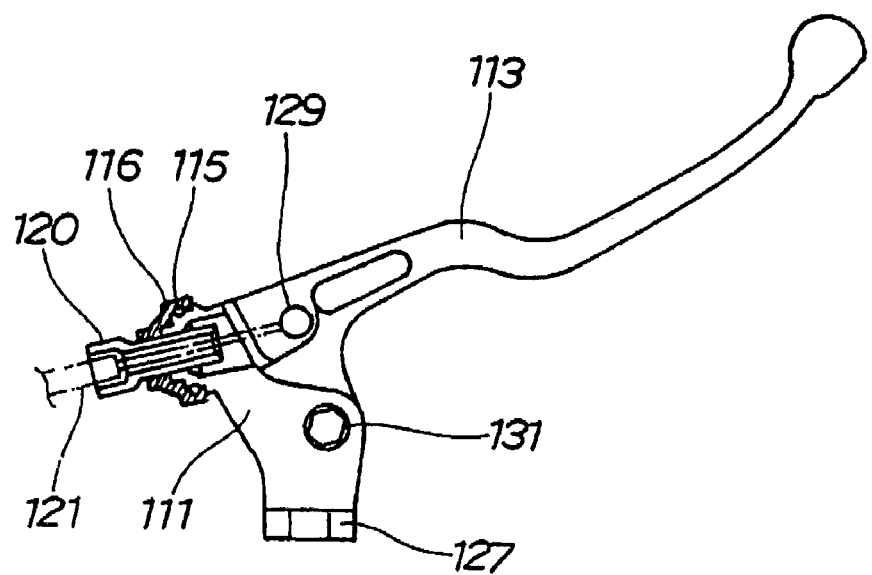
FIG. 20 is equivalent to FIG. 7 in JP-A-2001-14047.
Figure 21:
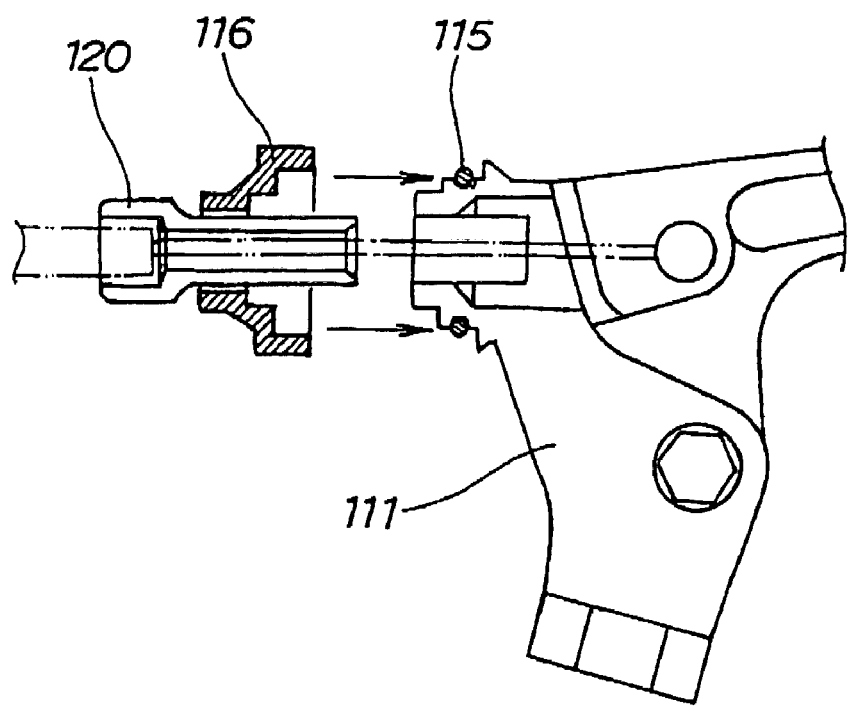
FIG. 21 is an exploded view showing a main part in FIG. 20.

FIGS. 19(*a*) and 19(*b*) are explanatory drawings for explaining the action of the state in which the concave portion and the convex portion are fitted after the dial member is turned.

As shown in FIG. 19(*a*), the dial member 39 is further turned in a direction shown by an arrow A by the force of the finger S put on the finger positioning part 71.

FIG. 19(*b*) shows that the concave portions 63RH, 63RLW having the substantially semicircular section and formed on the end face 62 of the flange 61 of the lever cover 36 are fitted to the convex portions 76LLW, 76RLW having the substantially semicircular section and formed on the face 75 of the dial member 39.

The dial member 39 is moved by 90° in the direction shown by the arrow A in relation to the lever cover 36 by the operation, the adjusting bolt 37 integrated with the dial member is similarly turned by 90°. Accordingly, the quantity in which the clutch lever is pulled also varies.

To acquire an optimum quantity in which the clutch lever is pulled, the pulled quantity of the clutch lever is adjusted by turning the dial member 39.

As a result, the pulled quantity of the clutch lever can be promptly and precisely adjusted by turning the dial member 39.

The characteristic of the elastic members forming the lever cover 36 and the dial member 39, the number of the concave portions and the convex portions, respectively, fitted and provided to the lever cover 36 and the dial member 39 and the sectional contour can be arbitrarily set.

In addition, the present invention is not limited to a motorcycle and can be also applied to any machinery having a clutch lever mechanism.

The present invention produces the following effect by the above-mentioned configuration.

The dial member made of elastic material is fitted to the head of the adjusting bolt with the concave portion/the convex portion being formed on the face on the side of the dial member and on the end face opposite to the face on the side of the dial member of the lever cover covering the lever bracket and the convex portion provided on one can be fitted into the concave portion provided on the other.

The concave portion or the convex portion formed on the end face of the lever cover and the face opposite to the end face on the side of the dial member is an elastic member and the concave portion and the convex portion are fitted.

As the convex portion provided on one out of the face on the side of the dial member or the end face of the lever cover hits the concave portion provided on the other, is raised and is fitted again when the dial member is turned, a clear click can be acquired.

As a result, a rider (an operator) can easily grasp the quantity in which the dial member is turned and can easily grasp the adjustment of the pulled quantity of the clutch wire.

As the dial member is provided with the finger positioning part for putting a finger on the peripheral face, the pulled quantity can be easily adjusted by a one touch operation.

As a result, the fine adjustment of the pulled quantity can be precisely made as it is desired.

Further, the clutch lever mechanism according to the present invention has a simple structure composed of the adjusting bolt, the dial member and the lever cover. Thus, the number of parts can be reduced and the manhours for assembly can be reduced.

The present invention provides a convex portion that has a substantially semicircular section and a concave portion that has a substantially semicircular section.

When the convex portion hits the concave portion provided on the other, is raised and is fitted again because the convex portion and the concave portion have the substantially semicircular sections, the operation is made smooth and the operation of the dial member is easily facilitated.

The present invention includes the flange that is provided on one end of the lever cover and is fitted into the annular groove formed on the side of the dial member and both are coupled together.

That is, as the flange on the side of the lever cover is fitted into the annular groove on the dial member, the dial member never falls off the lever cover.

Further, a clear click and suitably soft rotational operation feeling can be acquired by arbitrarily adjusting the rigidity of the flange formed on the lever cover by elastic material.

As a confined structure in which the flange of the lever cover and the annular groove of the dial member are fitted is acquired, no water and no dust enter the clutch cable.

As a result, the durability of the clutch lever mechanism can be enhanced.

In the present invention the adjusting bolt is provided with the hexagonal head having the hexagonal section, the dial member is provided with the hexagonal hole corresponding to the hexagonal head and the projections for pressing the hexagonal head are provided on the hexagonal hole.

As the projections are provided on the hexagonal hole on the side of the dial member and the hexagonal head of the adjusting bolt is pressed by the projections, play in the fitted part can be eliminated.

As a result, the adjusting bolt can be more readily integrated with the dial member.

As the dial member and the adjusting bolt are integrated, abrasion which may be caused in the fitted part between the dial member and the adjusting bolt can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch lever mechanism for a motorcycle in which a lever bracket is attached to a handlebar, a clutch lever is attached to the lever bracket so that the clutch lever can be pivoted, one end of clutch wire is connected to the clutch lever so that a clutch can be operated by the clutch lever, an adjusting bolt is screwed to the lever bracket and the quantity of the play of the clutch lever can be adjusted by turning the adjusting bolt, comprising:

a dial member made of elastic material and provided with a finger positioning part for positioning a finger on the peripheral face is set on the adjusting bolt so that the adjusting bolt can be turned via the dial member;

the lever bracket is covered with a lever cover made of elastic material and arranged in series with the dial member along the clutch wire;

wherein concave portions are provided on a rear end face of the lever cover in a position opposite to an end face of the dial member; and after the dial member is turned, a convex portion provided on the end face of the dial member can be fitted to an arbitrary one of the concave portions provided on the lever cover.

2. The clutch lever mechanism for a motorcycle according to claim 1, wherein the convex portion has a substantially semicircular section and the concave portion has a substantially semicircular section.

3. The clutch lever mechanism for a motorcycle according to claim 1, wherein the dial member is coupled to the lever cover by providing a flange to one end of the lever cover and a concave portion or a convex portion to the end face of the flange, by providing an annular groove corresponding to the flange on the side of the dial member and a concave portion or a convex portion to one side forming the annular groove and by fitting the flange into the annular groove.

4. The clutch lever mechanism for a motorcycle according to claim 1, wherein:
the adjusting bolt is provided with a hexagonal head having a hexagonal section;
the dial member is provided with a hexagonal hole corresponding to the hexagonal head; and
projections for pressing the hexagonal head are provided in the hexagonal hole.

5. The clutch lever mechanism for a motorcycle according to claim 1, wherein said lever bracket includes a retaining member for selectively releasably securing the lever cover relative to the lever bracket.

6. The clutch lever mechanism for a motorcycle according to claim 5, wherein said lever bracket includes a projection and said lever cover includes a recess for enabling a selective release of the lever cover relative to the lever bracket.

7. The clutch lever mechanism for a motorcycle according to claim 1, wherein said dial member includes an inner surface including a retainer for eliminating play between the dial member and the adjusting bolt.

8. The clutch lever mechanism for a motorcycle according to claim 7, wherein said inner surface of the dial member includes at least one projection for engaging with said adjusting bolt for eliminating play therebetween.

9. The clutch lever mechanism for a motorcycle according to claim 1, wherein said adjusting bolt includes a slit extending along a length direction thereof for enabling attachment/detachment of said clutch wire.

10. The clutch lever mechanism for a motorcycle according to claim 1, wherein a plurality of concave portions are provided on the rear end face of the lever cover in the position opposite to the end face of the dial member for determining the adjustment of the clutch wire as the dial member is rotated.

11. A lever mechanism for a motorcycle comprising:
a lever bracket;
a lever operatively attached to the lever bracket so that the lever can be pivoted, said lever being adapted to be secured to a wire;
an adjusting bolt threaded the lever bracket for selectively being manually extended or retracted;
a dial member provided with a finger positioning part for positioning a finger on the peripheral face, said dial member being mounted relative to the adjusting bolt so that the adjusting bolt can be turned via the dial member;
a lever cover for covering the lever bracket, said lever cover being arranged in series with the dial member along the wire;
wherein concave portions are provided on an end face of the lever cover in a position opposite to an end face of the dial member; and
after the dial member is turned, a convex portion provided on the end face of the dial member can be fitted to an arbitrary one of the concave portions provided on the lever cover for determining the amount of rotation of the dial member relative to the lever cover.

12. The lever mechanism for a motorcycle according to claim 11, wherein the convex portion has a substantially semicircular section and the concave portion has a substantially semicircular section.

13. The lever mechanism for a motorcycle according to claim 11, wherein the dial member is coupled to the lever cover by providing a flange to one end of the lever cover and a concave portion or a convex portion to the end face of the flange, by providing an annular groove corresponding to the flange on the side of the dial member and a concave portion or a convex portion to one side forming the annular groove and by fitting the flange into the annular groove.

14. The lever mechanism for a motorcycle according to claim 11, wherein:
the adjusting bolt is provided with a hexagonal head having a hexagonal section;
the dial member is provided with a hexagonal hole corresponding to the hexagonal head; and
projections for pressing the hexagonal head are provided in the hexagonal hole.

15. The lever mechanism for a motorcycle according to claim 11, wherein said lever bracket includes a retaining member for selectively releasably securing the lever cover relative to the lever bracket.

16. The lever mechanism for a motorcycle according to claim 15, wherein said lever bracket includes a projection and said lever cover includes a recess for enabling a selective release of the lever cover relative to the lever bracket.

17. The lever mechanism for a motorcycle according to claim 11, wherein said dial member includes an inner surface including a retainer for eliminating play between the dial member and the adjusting bolt.

18. The lever mechanism for a motorcycle according to claim 17, wherein said inner surface of the dial member includes at least one projection for engaging with said adjusting bolt for eliminating play therebetween.

19. The lever mechanism for a motorcycle according to claim 11, wherein said adjusting bolt includes a slit extending along a length direction thereof for enabling attachment/detachment of said wire.

20. The lever mechanism for a motorcycle according to claim 11, wherein a plurality of concave portions are provided on the rear end face of the lever cover in the position face opposite to the end face of the dial member for determining the adjustment of the wire as the dial member is rotated.

* * * * *